US006706365B2

United States Patent
Akasaka et al.

(10) Patent No.: US 6,706,365 B2
(45) Date of Patent: Mar. 16, 2004

(54) IMPACT ABSORBING MEMBER FOR VEHICLE

(75) Inventors: Kouji Akasaka, Gunma (JP); Takashi Koike, Gunma (JP)

(73) Assignee: Moriroku Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/978,775

(22) Filed: Oct. 18, 2001

(65) Prior Publication Data

US 2002/0054977 A1 May 9, 2002

(30) Foreign Application Priority Data

Oct. 19, 2000 (JP) ......................................... 2000-319161

(51) Int. Cl.[7] .............................. B32B 3/12; B32B 3/26; B32B 3/00; B60J 7/00; B60K 37/00
(52) U.S. Cl. ....................... 428/156; 428/158; 428/159; 428/160; 428/178; 428/71; 428/117; 428/304.4; 280/751; 280/752; 296/189; 296/188; 296/187.12
(58) Field of Search ................... 428/156, 158, 428/315, 304.4, 71, 178, 159, 168, 117; 296/189, 188, 187.12; 280/751, 752

(56) References Cited

U.S. PATENT DOCUMENTS

| | | | | | |
|---|---|---|---|---|---|
| 3,544,417 | A | * | 12/1970 | Corzine | 428/104 |
| 3,834,962 | A | * | 9/1974 | Strumbos | 156/79 |
| 4,136,226 | A | * | 1/1979 | Gilman | 428/315 |
| 4,726,707 | A | * | 2/1988 | Newton | 404/25 |
| 5,884,962 | A | * | 3/1999 | Mattingly et al. | 296/189 |
| 6,207,244 | B1 | * | 3/2001 | Hesch | 428/35.9 |

FOREIGN PATENT DOCUMENTS

JP 11-60769 3/1999

* cited by examiner

Primary Examiner—Harold Pyon
Assistant Examiner—Catherine A. Simone
(74) Attorney, Agent, or Firm—Arent Fox Kintner Plotkin & Kahn PLLC

(57) ABSTRACT

An impact absorbing member includes a plurality of synthetic resin foams arranged in a stack, the foams being formed from a hard skin layer and a foamed layer formed within the skin layer, thereby enhancing the productivity in manufacture of the impact absorbing member for a vehicle.

1 Claim, 8 Drawing Sheets

IMPACT ABSORBING MEMBER FOR VEHICLE

BACKGROUND OF THE INVENTION

1. Field of the Invention

The present invention relates to an impact absorbing member for a vehicle and, in particular, to an impact absorbing member for a vehicle that is suitably used in order to absorb the impact generated when the knees of an occupant of the vehicle are involved in a secondary collision with, for example, an instrument panel.

2. Description of the Related Art

An impact absorbing member for a vehicle made of a synthetic resin in which a foamed layer is formed within a hard skin layer is known in, for example, Japanese Patent Application Laid-open No. 11-60769. This impact absorbing member for a vehicle comprises a hard skin layer formed by cooling and solidifying that portion of a foamable thermoplastic synthetic resin in contact with a mold device it has been injected into and a foamed layer formed within the skin layer by moving a part of the mold so as to foam an unhardened synthetic resin within the skin layer.

With regard to the above-mentioned conventional arrangement, the foamed layer is made to have a large thickness in order to enhance the impact absorbing effect, it takes a correspondingly long time to mold and it cannot be said that the productivity is high.

SUMMARY OF THE INVENTION

The present invention has been carried out in view of the above-mentioned circumstances, and it is an object of the present invention to provide an impact absorbing member for a vehicle that can improve the productivity.

In order to achieve the above-mentioned object, in accordance with a first aspect of the present invention, there is proposed an impact absorbing member for a vehicle, comprising a plurality of synthetic resin foams arranged in a stack, the foams being formed from a hard skin layer and a foamed layer formed within the skin layer.

In accordance with the above-mentioned arrangement, since the impact absorbing member for a vehicle comprises the plurality of foams arranged in a stack, the foamed layer of each of the foams can be relatively thin, the time required for molding each of the foams using a mold can be relatively short and the productivity of manufacture of the impact absorbing member for a vehicle can be improved.

Furthermore, in accordance with a second aspect of the present invention, in addition to the above-mentioned first aspect, there is proposed an impact absorbing member wherein irregular sections that mate with each other are formed on superimposed surfaces of the plurality of foams. In accordance with the above-mentioned arrangement, when the impact absorbing member receives an impact, the mating of the irregular sections can prevent the plurality of foams from slipping relative to each other. Moreover, the stress applied to the impact absorbing member can be dispersed by the irregular sections that mate with each other, and the impact absorbing ability can be further enhanced in comparison with a foam merely having an increased thickness.

Furthermore, in accordance with a third aspect of the present invention, in addition to the above-mentioned first aspect or second aspect, there is proposed an impact absorbing member wherein a void is formed between the superimposed surfaces of the plurality of foams. In accordance with the above-mentioned arrangement, the impact absorbing ability of the impact absorbing member can be yet further enhanced by the air layer of the void.

The above-mentioned objects, other objects, characteristics and advantages of the present invention will become apparent from an explanation of preferred embodiments that will be described in detail below by reference to the attached drawings.

BRIEF DESCRIPTION OF THE DRAWINGS

FIG. 1 is a longitudinal cross section of a glove box equipped with an impact absorbing member for a vehicle.

FIG. 2 is an exploded perspective view of the glove box in FIG. 1.

FIG. 3 is a cross section for explaining the procedure of assembling the glove box.

FIG. 4 is a partial longitudinal cross section of a mold device with a synthetic resin injected into it.

FIG. 5 is a partial longitudinal cross section of the mold device at a time when formation of a foam is completed.

FIG. 6 is a longitudinal cross section of a glove box equipped with an impact absorbing member for a vehicle.

FIG. 7 is an exploded perspective view of the glove box in FIG. 6.

FIG. 8 is a cross section for explaining the procedure of assembling the glove box.

DESCRIPTION OF PREFERRED EMBODIMENTS

Figure 1:
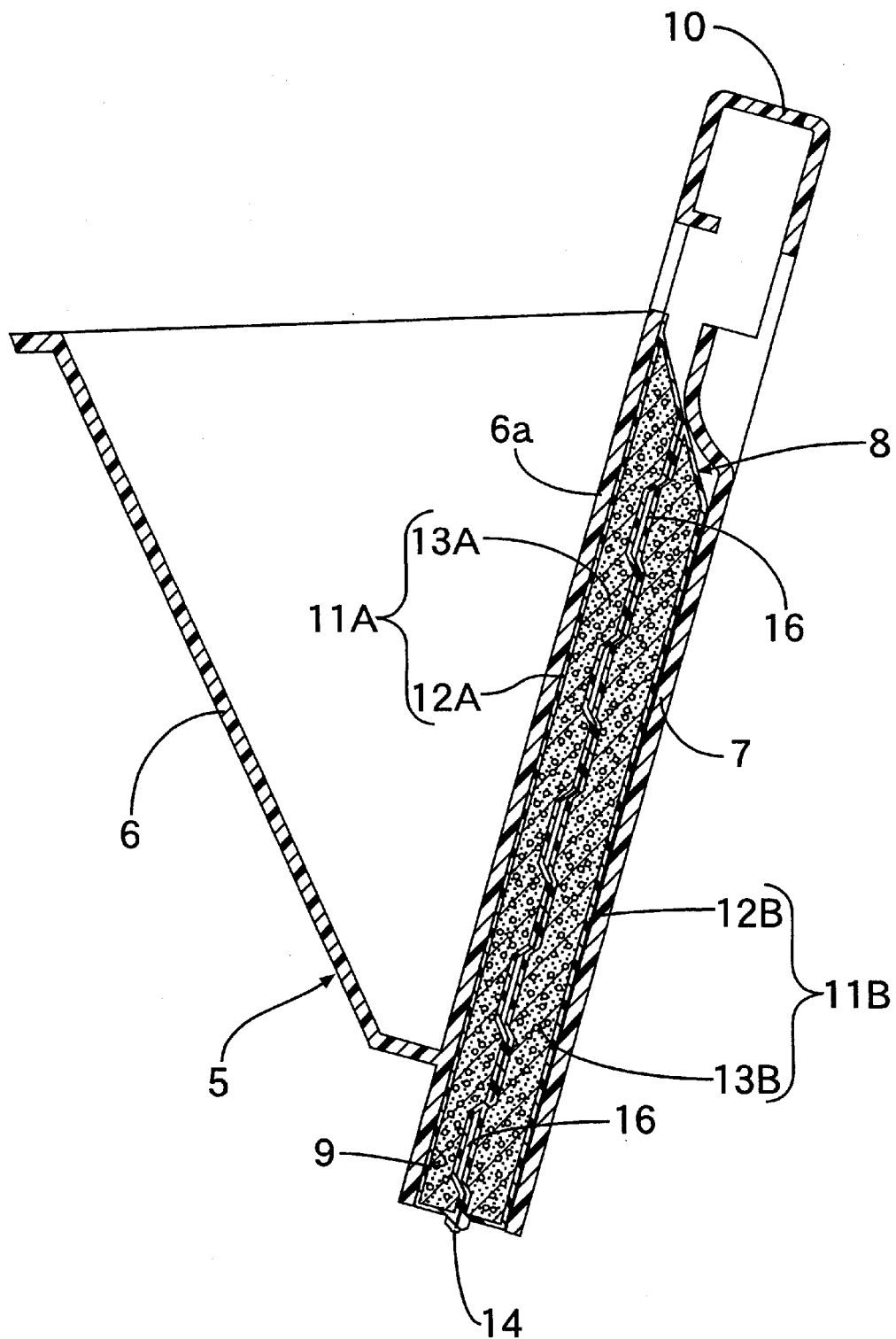
FIGS. 1 to 5 illustrate a first embodiment of the present invention.
Figure 2:
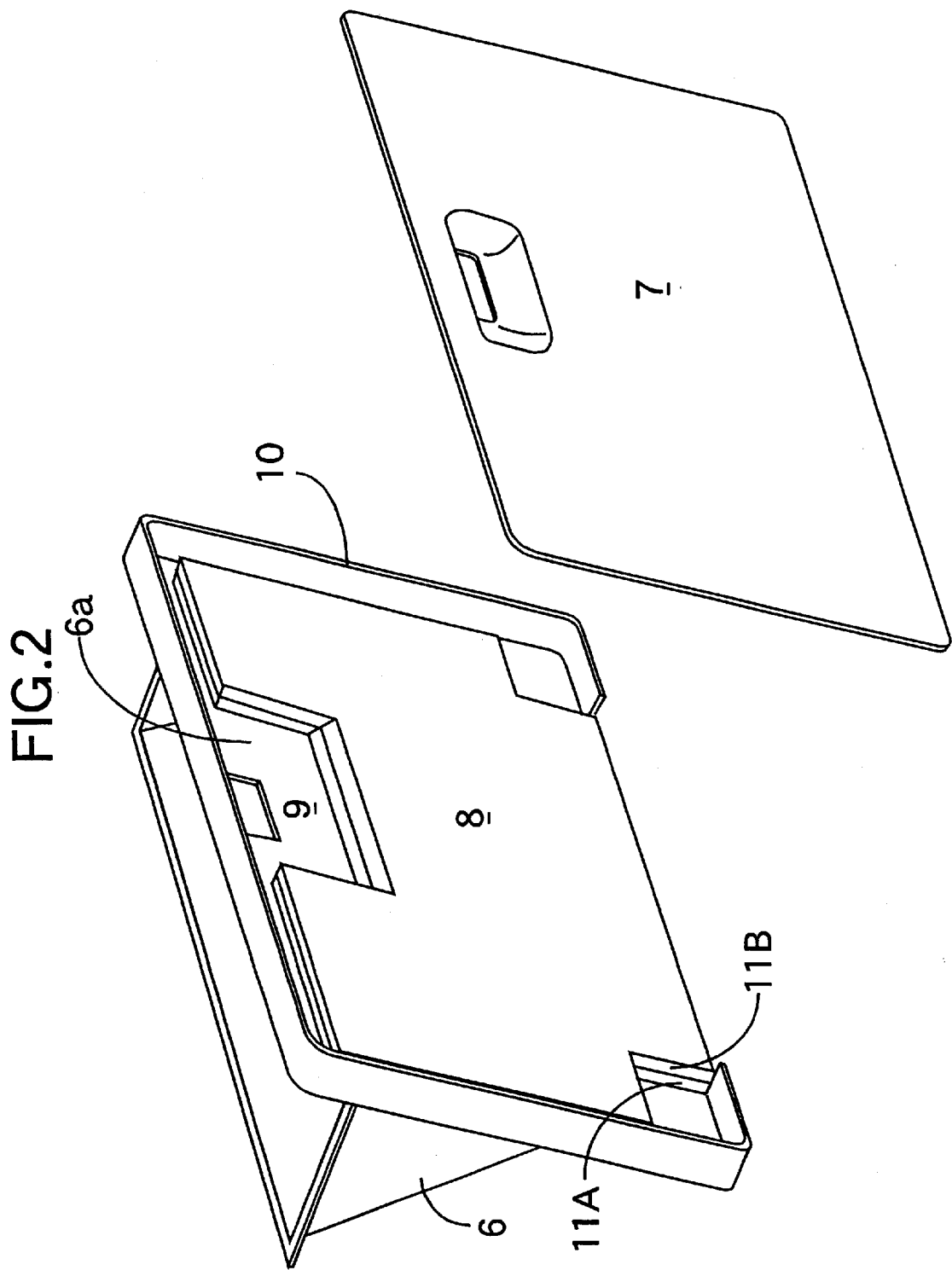
Figure 3:
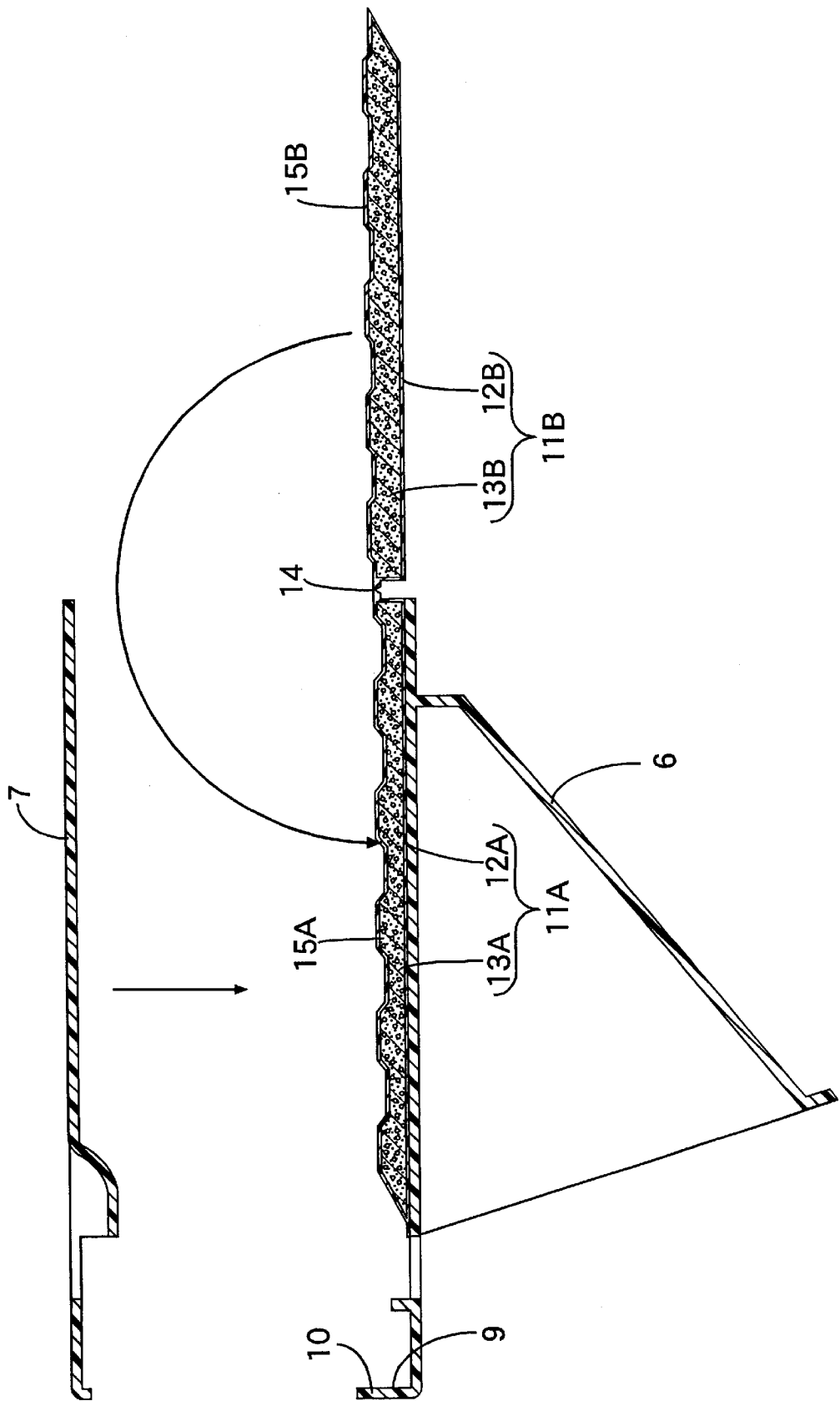

Referring to FIGS. 1 to 5, the first embodiment of the present invention is explained below. In FIGS. 1 to 3, a glove box 5 mounted in an instrument panel (not illustrated) of a vehicle has an arrangement in which a box member 6 and a lid member 7 are joined together by vibration welding, etc. and an impact absorbing member 8 according to the present invention is interposed between the box member 6 and the lid member 7. The impact generated when the knees of an occupant of the vehicle are involved in a secondary collision with the glove box 5 of the instrument panel is thereby absorbed, and the glove box 5 functions as a knee bolster.

The box member 6 is made of a synthetic resin in the form of a box opening upward having, as one of its walls, a rectangular opposing wall 6a that opposes the lid member 7. On the periphery of the opposing wall 6a, except for one part of its lower section, is provided an integral joining wall part 10 projecting toward the lid member 7 and forming, together with the opposing wall 6a, a recess 9 that opens both on its lower section and toward the lid member 7. The lid member 7 is also made of a synthetic resin, and the periphery of the lid member 7 is joined to the joining wall part 10.

The impact absorbing member 8 comprises a plurality of, for example two, foams 11A and 11B arranged in a stack, the foams being formed from hard skin layers 12A and 12B and foamed layers 13A and 13B formed within the skin layers 12A and 12B, and is housed in the recess 9 so as to be interposed between the opposing wall 6a of the box member 6 and the lid member 7.

The two foams 11A and 11B are formed integrally in a manner such that they can be bent via a thin hinge 14 that is integral with the two foams 11A and 11B. One foam, 11A, of the two foams 11A and 11B is formed so as to be connected integrally to the opposing wall 6a of the box member 6 within the recess 9. The above-mentioned one foam 11A is formed so as to be connected integrally to the opposing wall 6a so that the hinge 14 is positioned on the lower side of the recess 9. The edges, on the hinge 14 side, of the two foams 11A and 11B in the superimposed state are positioned, as shown in FIG. 1, so as to face outward in lower parts of the box member 6 and the lid member 7, which are joined together.

In the plane in which the two foams 11A and 11B are joined together are formed irregular sections 15A and 15B having a cross sectional profile in which, for example, trapezoidal projections and trapezoidal depressions are connected in turn so that the irregular sections 15A and 15B mate with each other when the two foams 11A and 11B are arranged in a stack. Moreover, the two irregular sections 15A and 15B are formed so that a void 16 is formed between a projection of one of the two irregular sections 15A and 15B and a depression of the other of the two irregular sections 15A and 15B. A plurality of voids 16 are thus formed in the plane in which the two foams 11A and 11B are joined together.

Figure 4:
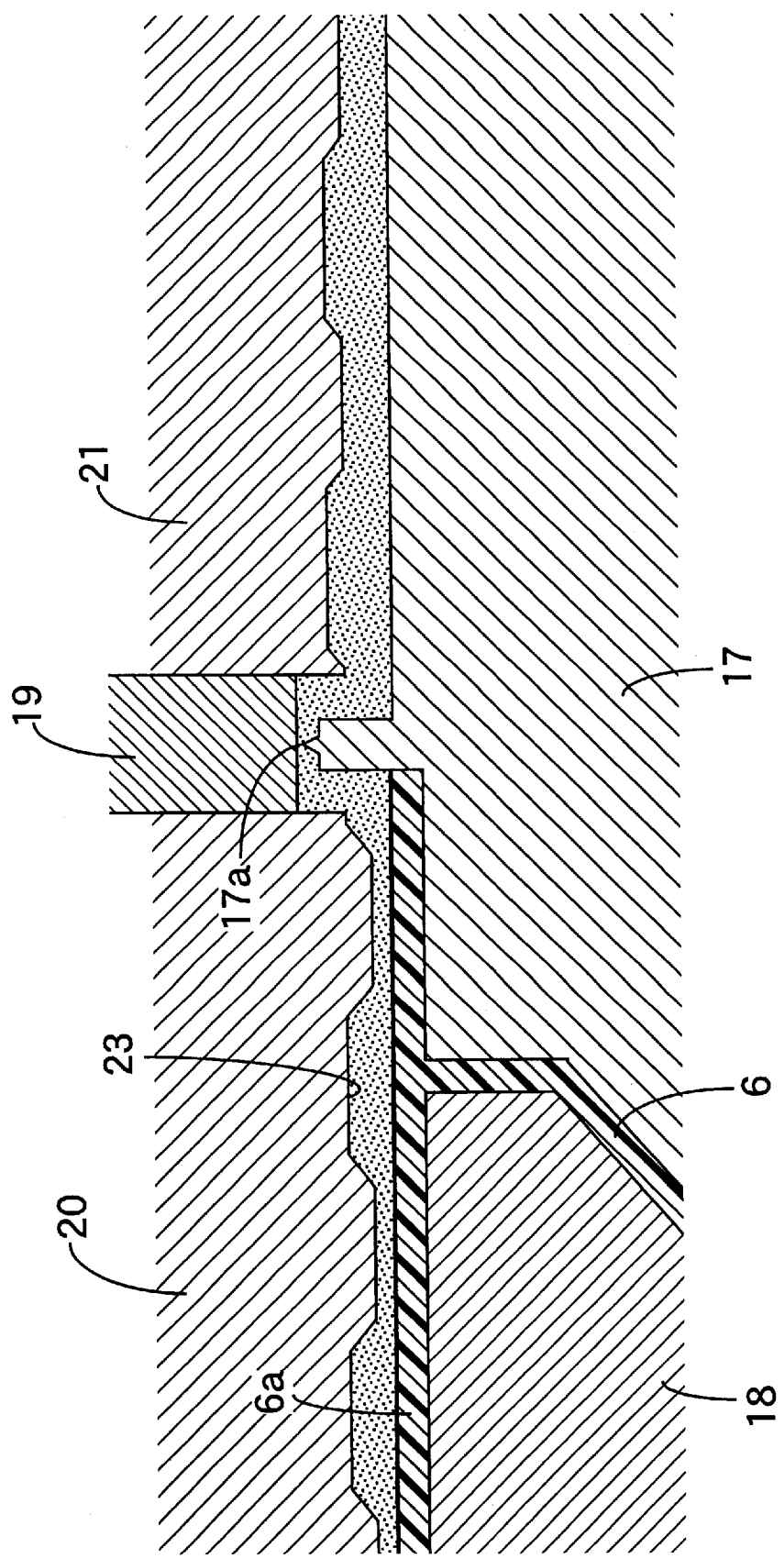

A mold device used for the molding of the two foams 11A and 11B, as shown in FIG. 4, has fixed first and second molds 17 and 18, a third mold 19 that can approach or depart from the first and second molds 17 and 18, and slide blocks 20 and 21 slidably supported in the third mold 19.

The first and second molds 17 and 18 support the box member 6 that has been molded so that a part of the opposing wall 6a thereof covers the second mold 18. A cavity 23 is defined by the first mold 17, a part of the opposing wall 6a of the box member 6, the third mold 19 and the slide blocks 20 and 21. A projection 17a is provided on the first mold 17 so as to form, together with the third mold 19, the hinge 14.

When molding the foams 11A and 11B using such a mold device, as shown in FIG. 4, a molten foamable synthetic resin is injected into the cavity 23 having a reduced capacity, the surface of the molten synthetic resin is cooled and hardened by means of the parts of the mold device that define the cavity 23, that is to say, the surface that is in contact with the first mold 17, the part of the opposing wall 6a of the box member 6, the third mold 19 and the slide blocks 20 and 21 is cooled and hardened while maintaining the pressure within the mold device so that the molten resin does not foam. The skin layers 12A and 12B are thereby formed so as to have a thickness of, for example, about 1 to 1.5 mm.

Figure 5:
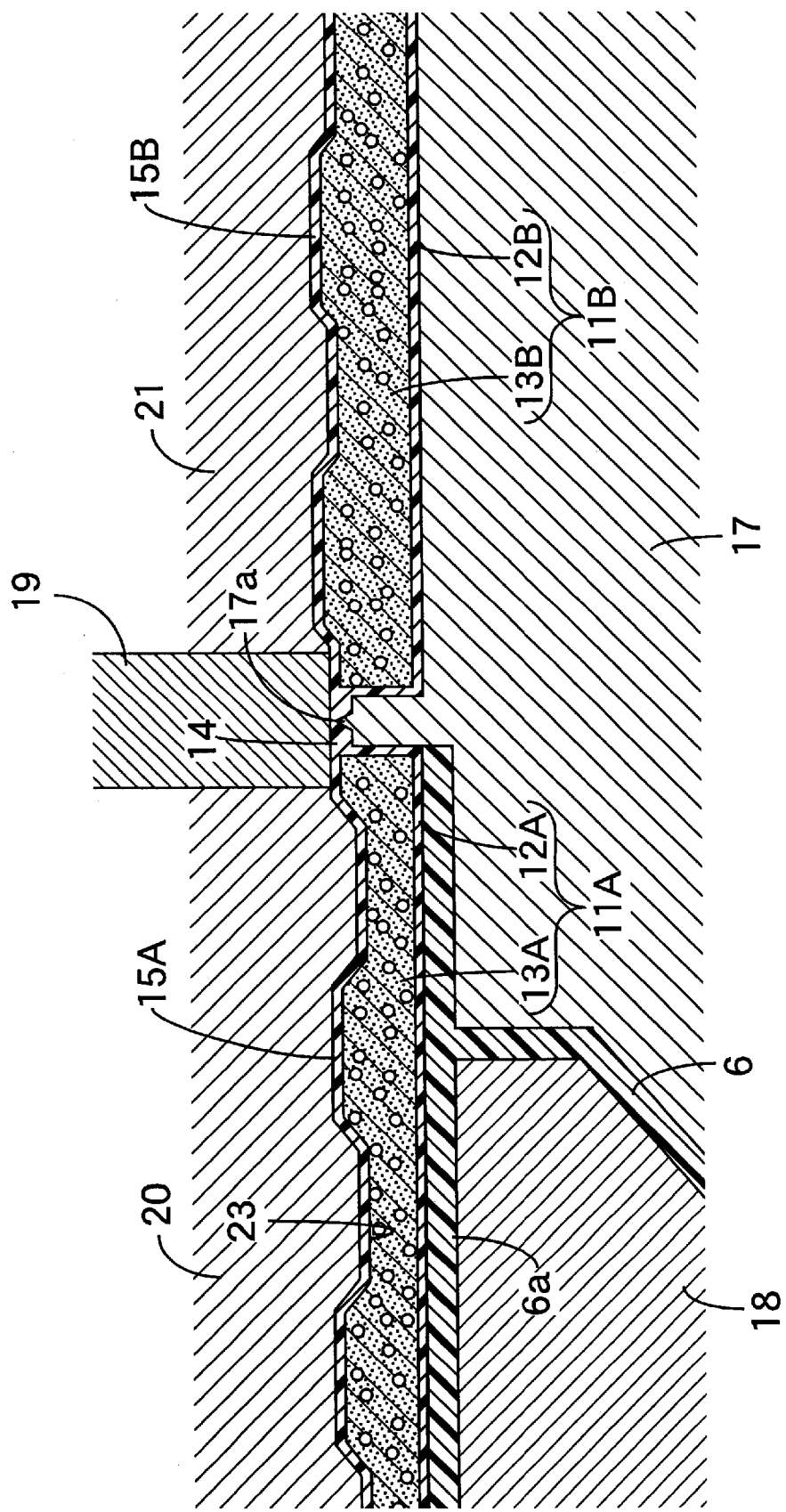

Subsequently, as shown in FIG. 5, sliding the slide blocks 20 and 21 so as to increase the capacity of the cavity 23 allows the synthetic resin remaining unhardened within the skin layers 12A and 12B to foam in response to a decrease in the pressure of the cavity 23 thus forming the foams 11A and 11B having the foamed layers 13A and 13B within the skin layers 12A and 12B, the thickness of each of the foams 11A and 11B being, for example, about 6 mm. Molding of the foams 11A and 11B in a connected manner via the hinge 14 is completed after an adequate expansion and cooling time, the skin layer 12A of the foam 11A being connected integrally to the opposing wall 6a of the box member 6.

The action of the first embodiment is now explained. The impact absorbing member 8 attached to the glove box 5 comprises the pair of synthetic resin foams 11A and 11B arranged in a stack, the foams 11A and 11B being formed from the hard skin layers 12A and 12B and the foamed layers 13A and 13B formed within the skin layers 12A and 12B. Even when the foamed layers 13A and 13B of the foams 11A and 11B are relatively thin, a sufficient thickness can be ensured for the whole impact absorbing member 8. It is therefore possible to increase the productivity of manufacture of the impact absorbing member 8 by making the foamed layers 13A and 13B relatively thin and the molding time of the foams 11A and 11B in the mold device relatively short.

Furthermore, in this first embodiment, the pair of foams 11A and 11B that can be bent via the hinge 14 are molded simultaneously using an integrated mold device so as to integrally connect the one foam 11A to the opposing wall 6a of the box member 6 of the glove box 5, and the productivity can thereby be yet further increased.

Since the irregular sections 15A and 15B that mate with each other are formed in the plane in which the two foams 11A and 11B are superimposed, when the impact absorbing member 8 formed by stacking the two foams 11A and 11B receives an impact, the mating of the irregular sections 15A and 15B with each other can prevent the two foams 11A and 11B from slipping relative to each other thus dispersing the stress applied to the impact absorbing member 8 by the mated together irregular sections 15A and 15B and improving the impact absorbing ability in comparison with a foam merely having an increased thickness.

Furthermore, since the voids 16 are formed in the plane in which the two foams 11A and 11B are superimposed, the impact absorbing ability of the impact absorbing member 8 can be yet further improved due to the air layers of the voids 16.

Figure 6:
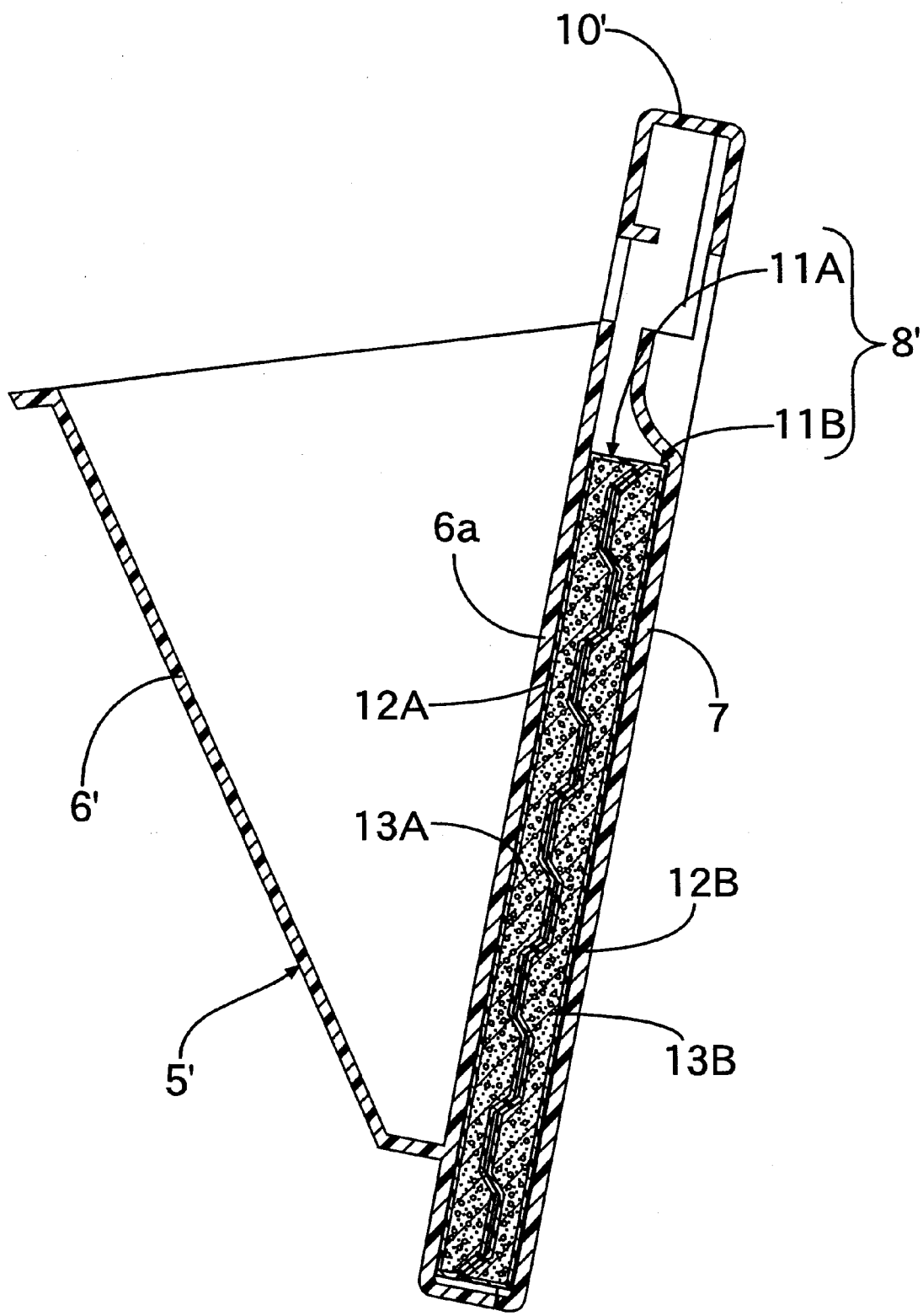
FIGS. 6 to 8 illustrate a second embodiment of the present invention.
Figure 7:
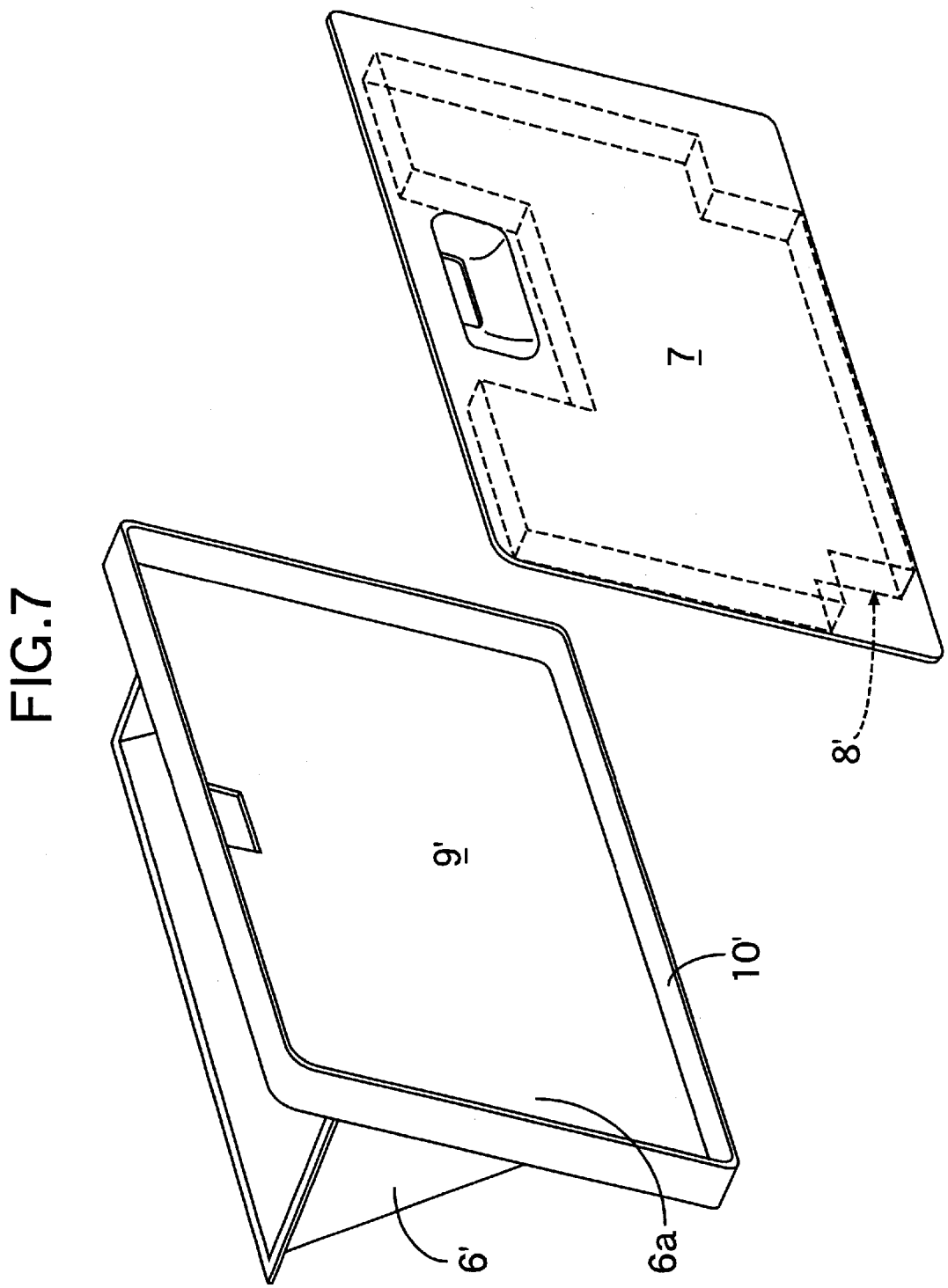
Figure 8:
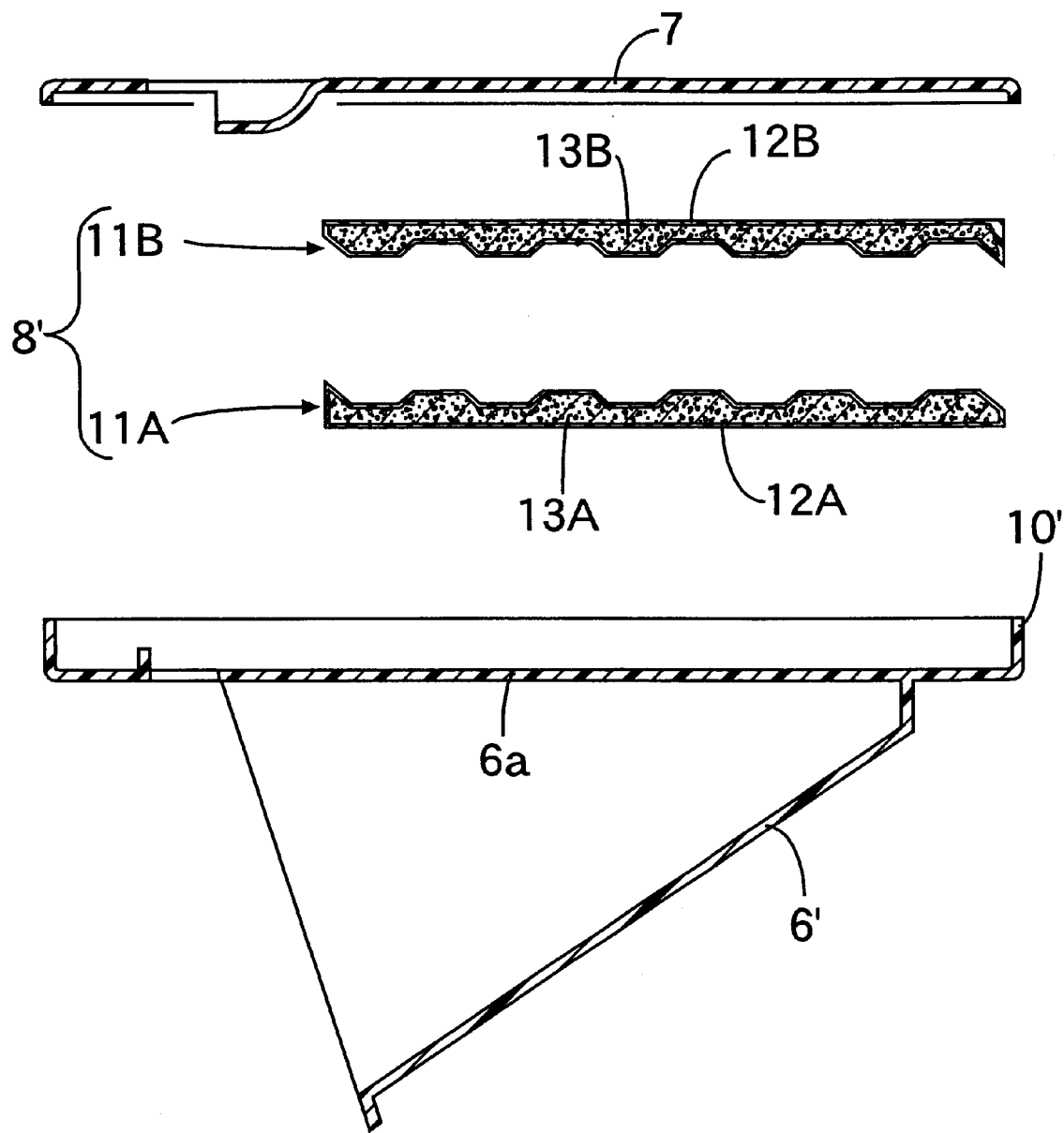

Referring to FIGS. 6 to 8, a second embodiment of the present invention is now explained. A glove box 5' is formed by joining a box member 6' and a lid member 7 to each other by vibration welding, etc. Between the box member 6' and the lid member 7A is interposed an impact absorbing member 8'.

On the whole periphery of a rectangular opposing wall 6a of the box member 6' made of a synthetic resin is provided an integral joining wall part 10' so as to project toward the lid member 7. The joining wall part 10' forms, together with the opposing wall 6a, a recess 9' opening on the lid member 7 side. The lid member 7 made of a synthetic resin is joined to the joining wall part 10'.

The impact absorbing member 8' comprises a plurality of, for example two, foams 11A and 11B arranged in a stack, the foams being formed from hard skin layers 12A and 12B and foamed layers 13A and 13B formed within the skin layers 12A and 12B. The two foams 11A and 11B are molded separately from each other, and the impact absorbing member 8' formed by stacking the two foams 11A and 11B on each other is housed in the recess 9' so as to be interposed between the opposing wall 6a of the box member 6' and the lid member 7.

In accordance with this second embodiment, the productivity of manufacture of the impact absorbing member 8' can be increased as is the case with the above-mentioned first embodiment.

It is also possible to mold the foam 11A integrally with the opposing wall 6a of the box member 6' and to mold the foam 11B integrally with the lid member 7, so that the productivity can be increased yet further.

Although embodiments of the present invention have been explained in detail above, the present invention is in no way limited by the above-mentioned embodiments and can be modified in a variety of ways without departing from the spirit and scope of the present invention described in the appended claims.

What is claimed is:

1. An impact absorbing member for a vehicle comprising:

a plurality of synthetic resin foams arranged in a stack, each foam comprising a hard skin layer and a foamed layer entirely enclosed within the skin layer, wherein a plurality of irregular sections of projections and depressions that mate with each other are formed by superimposed surfaces of the plurality of foams, wherein a void is formed between the superimposed surfaces of the plurality of foams.

* * * * *